US012735931B2

(12) United States Patent
Reisender

(10) Patent No.: US 12,735,931 B2
(45) Date of Patent: Sep. 15, 2026

(54) HIGH-SECURITY SELF-RISING ACCESS FRAME DOOR

(71) Applicant: David Reisender, Ellenville, NY (US)

(72) Inventor: David Reisender, Ellenville, NY (US)

( * ) Notice: Subject to any disclaimer, the term of this patent is extended or adjusted under 35 U.S.C. 154(b) by 0 days.

(21) Appl. No.: 18/999,688

(22) Filed: Dec. 23, 2024

(65) Prior Publication Data

US 2026/0176907 A1 Jun. 25, 2026

(51) Int. Cl.
*E05F 1/16* (2006.01)
*E05B 65/00* (2006.01)
*E05C 1/00* (2006.01)

(52) U.S. Cl.
CPC ............ *E05F 1/16* (2013.01); *E05B 65/0017* (2013.01); *E05C 1/004* (2013.01)

(58) Field of Classification Search
CPC ......... E05F 1/16; E05B 65/0017; E05C 1/004
See application file for complete search history.

(56) References Cited

U.S. PATENT DOCUMENTS

| | | | | |
|---|---|---|---|---|
| 6,302,325 | B1 | 10/2001 | Alexander | |
| 6,378,769 | B1 | 4/2002 | Wolgamot | |
| 6,588,655 | B2 * | 7/2003 | Stapleton, Jr. | E06B 7/34 232/44 |
| 6,651,876 | B2 * | 11/2003 | Scott | E05B 65/0841 292/28 |
| 6,817,481 | B2 * | 11/2004 | Alexander | E06B 7/28 109/67 |
| 7,121,042 | B2 * | 10/2006 | Robert | E05F 15/53 49/260 |
| 9,016,558 | B2 | 4/2015 | Alexander | |
| 9,963,930 | B1 * | 5/2018 | Reisender | E06B 7/32 |
| 10,487,571 | B2 | 11/2019 | Humma | |
| 10,612,298 | B1 | 4/2020 | Jackson | |
| 2004/0000552 | A1 * | 1/2004 | Alexander | E06B 7/28 220/259.2 |
| 2015/0247360 | A1 * | 9/2015 | Alexander | E06B 7/32 232/43.1 |
| 2020/0017032 | A1 * | 1/2020 | Catlin | E05F 1/16 |
| 2020/0199926 | A1 * | 6/2020 | Tewes | E05F 11/08 |
| 2020/0308903 | A1 * | 10/2020 | Anderson | E05F 15/76 |
| 2023/0023106 | A1 | 1/2023 | Thomson | |
| 2025/0204683 | A1 * | 6/2025 | Janser | F02D 41/0025 |

* cited by examiner

*Primary Examiner* — Gregory J Strimbu
(74) *Attorney, Agent, or Firm* — Dunlap Bennett & Ludwig PLLC

(57) ABSTRACT

A closure system for the access opening in a barrier to an enclosed space for confining individuals. The closure system has a rear frame plate, a front frame plate, middle spacer plates and a sliding door slidable between the frame plates to move between an open position and a closed position closing off the access opening. One or more door springs configured to bias the sliding door towards a partially open position, when the sliding door is unlocked by an associated locking mechanism, and thereby providing single-handed functionality. Dual purpose guide-security bars along a rear surface of the sliding door are configured for both preventing the sliding door from getting jammed when sliding and for preventing a confined individual from tampering with the locking mechanism.

11 Claims, 13 Drawing Sheets

HIGH-SECURITY SELF-RISING ACCESS FRAME DOOR

BACKGROUND OF THE SUBJECT DISCLOSURE

The subject disclosure relates to access opening closure systems for high-security doors and, more particularly, to a self-rising access opening closure system.

This high-security access self-rising frame door access opening also incorporates two high security anti-tampering guide bars configured to prevent the self-rising stainless-steel sliding door from getting wedged in the tracks of a supportive frame while also preventing tampering with an adjacent locking mechanism that engages and controls the self-rising sliding stainless-steel door. In facilities where individuals are confined in an enclosed space against their will, such as in jails, prisons, psychiatric wards, military brigs and other facilities premised on isolating recipients, the door or barrier that bars those individuals from leaving the enclosed space typically provides an "access opening" therein, through which food, legal documents, mail, medicine and other items can be provided. The new self-rising frame door for access openings, disclosed herein, also allows for the safe handcuffing of prisoners, and the disbursement of chemical agents (tear gas) into the cell safely without contamination of the surrounding areas.

Since many individuals confined against their will are looking for a means of escaping their confinement or attacking personnel involved in their incarceration, it is imperative to address the current antiquated cell door openings used in today's facilities that are not appropriate for the most violent and dangerous individuals. The newly developed high-security, self-rising access opening closure system is used to address these security needs. The new high security self-rising access opening closure system have a closure apparatus that facilitates the safe delivery and execution of said food, medicine, handcuffing of prisoners, and disbursement of chemical agents (tear gas) into the cell safely without contamination of the surrounding areas while aiming to prevent attacks on personnel utilizing the access opening, as well as preventing the unauthorized removal, tampering or circumvention of the high security self-rising frame door access opening closure apparatus. Regardless, isolated individuals are constantly attempting to exploit security flaws inherent in currently used cell door access opening closures found in today's facilities, to physically assault personnel with hazardous bodily fluids, chemicals and weapons and otherwise seriously threatening personnel outside their cell.

Typically, the high security self-rising frame door access opening closure systems provide a barrier frame assembly that supports the sliding door, wherein the sliding door is movable between a closed position and an open position relative to the access opening. The barrier frame assembly also operatively associates with an adjunct housing assembly that defines a compartment that communicates with the external face of the access opening when the slidable door is in the open position, making objects placed in the compartment accessible to the incarcerated, who can reach through the high security self-rising frame door access opening into the compartment. It goes without saying that the sliding door is movable between a locked condition and an unlocked condition. Separately, the compartment of the housing assembly has a cover that is lockable.

There are many possibly and probable points of failure that the inventor has problem-solved from his extensive personal correctional law enforcement experience in the field of access opening closure devices (see inventor's U.S. Pat. No. 9,963,930B1, the disclosure of which is incorporated by reference herein).

One big problem with the prior art that the sliding door tends to get stuck and jammed in its tracks, which are defined by the barrier frame assembly. Typically, this happens because the sliding door may travel a small degree out of alignment relative to the path defined by the tracks so that the sliding door, being slightly askew, exhibits an increased cross section, causing the sliding door to wedge in the tracks.

Another problem that occurs is that inmates attempt from within their cells to access the doors security locking device that controls the sliding door or barrier frame assembly. The noted security tracks of the subject disclosure, in addition to performing the task of a guide rail, and an anti-jam component for the stainless-steel door, restricts and prevents a prisoner housed within a cell from accessing the security locking mechanism of the sliding door.

Yet another disadvantage of prior art access opening closure devices is that vertically moving sliding doors may unintentionally move under the force of gravity from the open position to the closed position resulting in a guillotine effect, which can cause devastating personal injuries to both prisoners and personnel.

As can be seen, there is a need for a safe high-security access opening closure system with a self-rising door and anti-tampering guide bars configured to prevent the self-rising door from getting stuck in its track while also preventing tampering with the locking mechanism of the sliding door.

SUMMARY OF THE SUBJECT DISCLOSURE

In one aspect of the subject disclosure, the vertical sliding steel door of the subject disclosure alleviates any possibility of "bending" of the sliding door when moving it between the open and closed positions (a problem commonly encountered with older style side sliding door designs).

In one aspect of the subject disclosure, a closure system for an access opening in a barrier of an enclosed space for confining individuals, the closure system includes the following: a rear frame plate; a front frame plate; a sliding door of which is slidable between the rear and front frame plates so as to move between an open position and a closed position closing off the access opening; and one or more pistons configured to bias the sliding door in a partially open position, wherein approximately two-thirds of the access opening is closed off.

In another aspect of the subject disclosure, the closure system further includes wherein the one or more pistons are nested in canals formed between the rear and front frame plates, wherein each piston is housed is a respective canal, each canal defined by complementary cutouts in both the rear and front frame plates; and further including two guide bars along a rear surface of the sliding door; and along the rear frame plate, two guide bar channels dimensions to slidably receive the two guide bars, respectively.

These and other features, aspects and advantages of the subject disclosure will become better understood with reference to the following drawings, description and claims.

DETAILED DESCRIPTION OF THE INVENTION

Figure 1A:
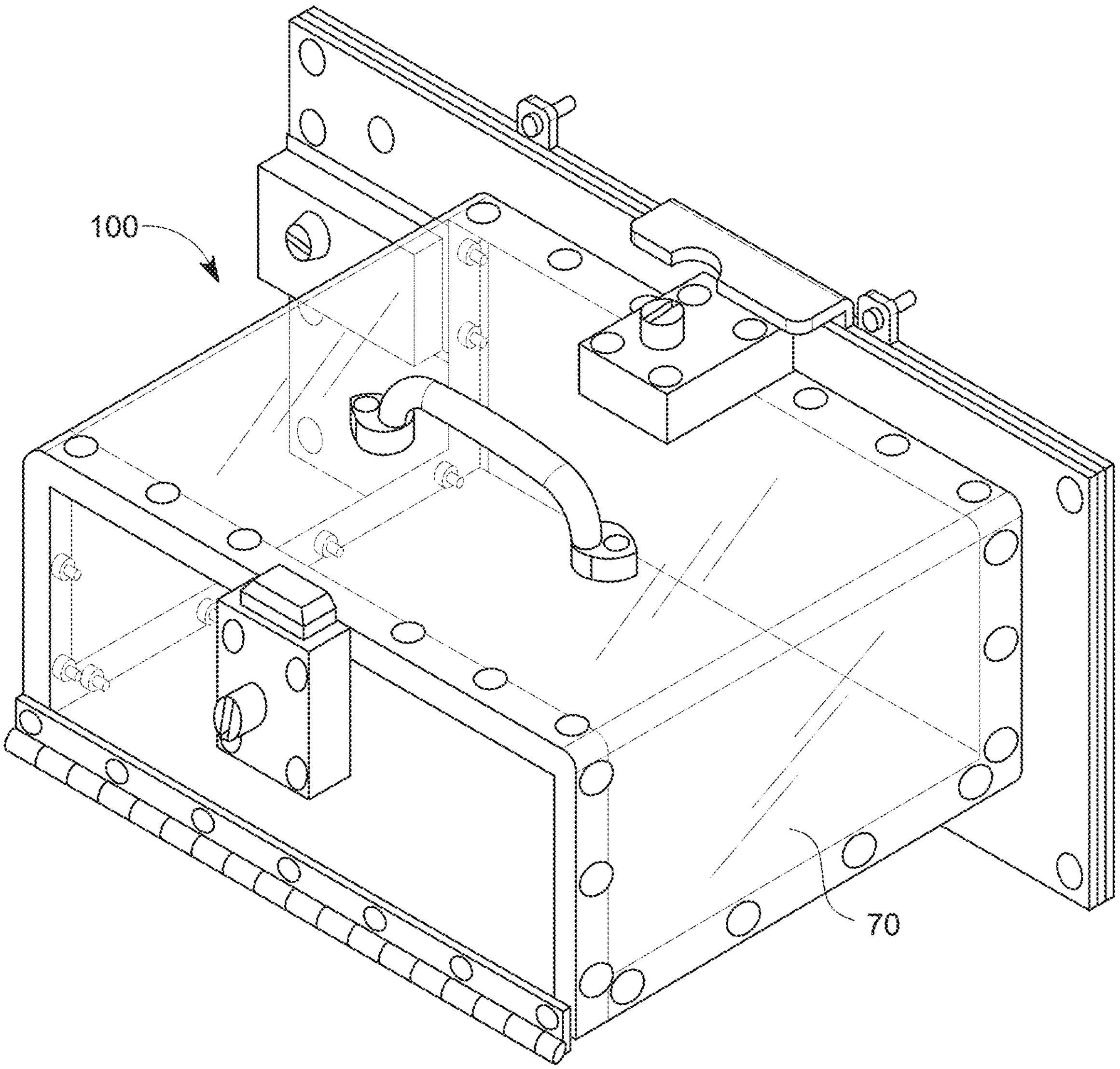
FIG. 1A is a perspective view of the overall access opening closure system 100 of the subject disclosure.
Figure 1B:
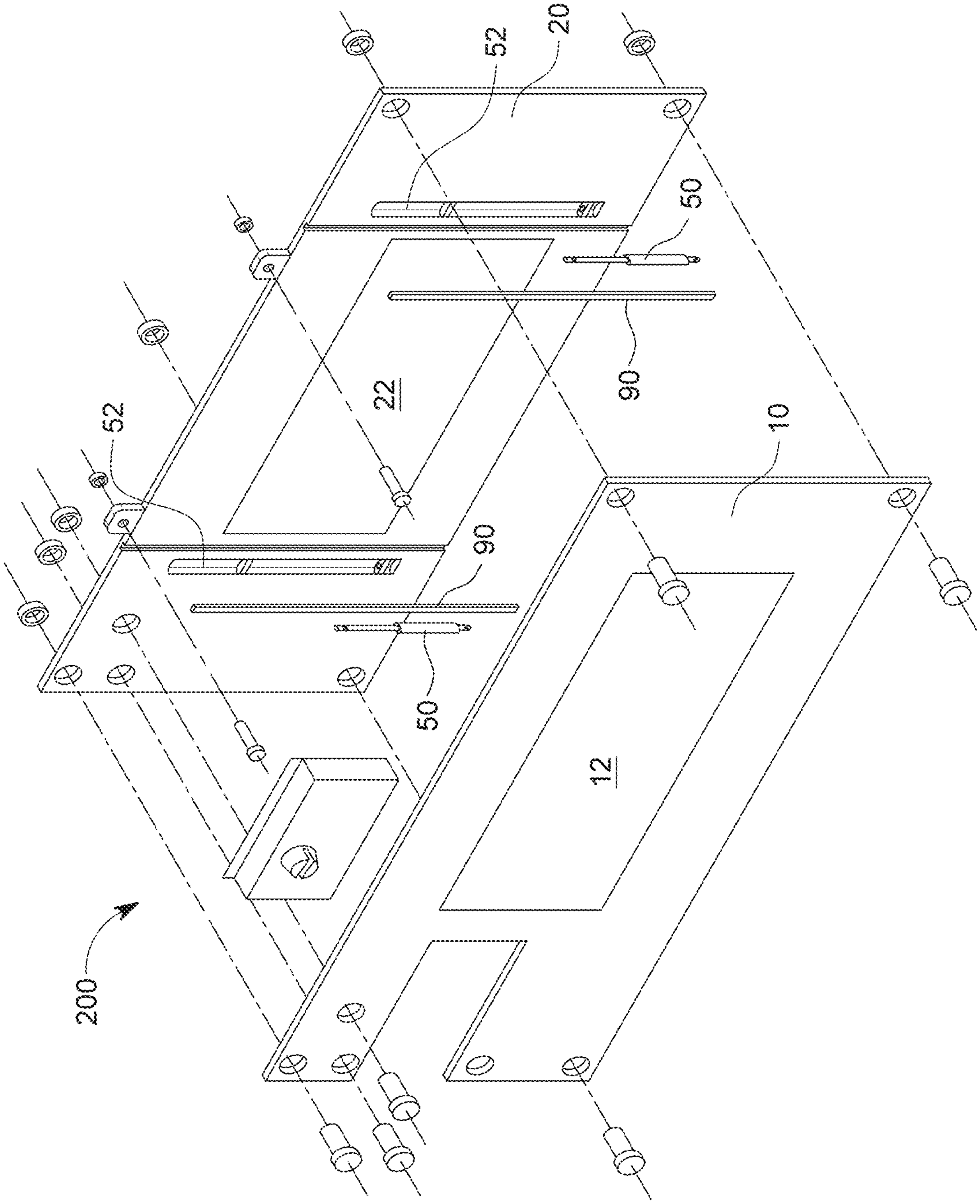
FIG. 1B is an exploded perspective view of a barrier frame assembly, illustrating a rear frame plate 20, a front frame plate 10, slide door springs 50, and slide door guide bars 90.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, an embodiment of the subject disclosure provides high security access opening closure system with a self-rising door having anti-tampering guide bars configured to prevent the self-rising door from getting jammed in its track while also preventing tampering with the locking mechanism of the sliding door.

The access opening closure system 100 provides a barrier frame assembly 200 that circumscribes an access opening (not explicitly shown) of and connects to a barrier (not shown). The barrier frame assembly 200 supports a sliding door 30 adjacent the access opening, wherein the sliding door 30 is movable between an open position and a closed position closing of access to the access opening. The barrier frame assembly 200 may provide a front frame plate 10 and rear frame plate 20, wherein the rear frame plate 20 is directly connected to the barrier. (Not shown are center plates that go between the front and rear frame plates that allow the door to move freely between the front and rear frame plates.) Both frame plates 10 and 20 provide openings 12 and 22, respectively, that align with the access opening of the barrier. Slidable between the front and rear frame plates 10 and 20 is a sliding door 30. The sliding door 30 rides along a track defined by the front and rear frame plates 10 and 20. Fasteners couple the front and rear frame plates 10 and 20.

Figure 2:
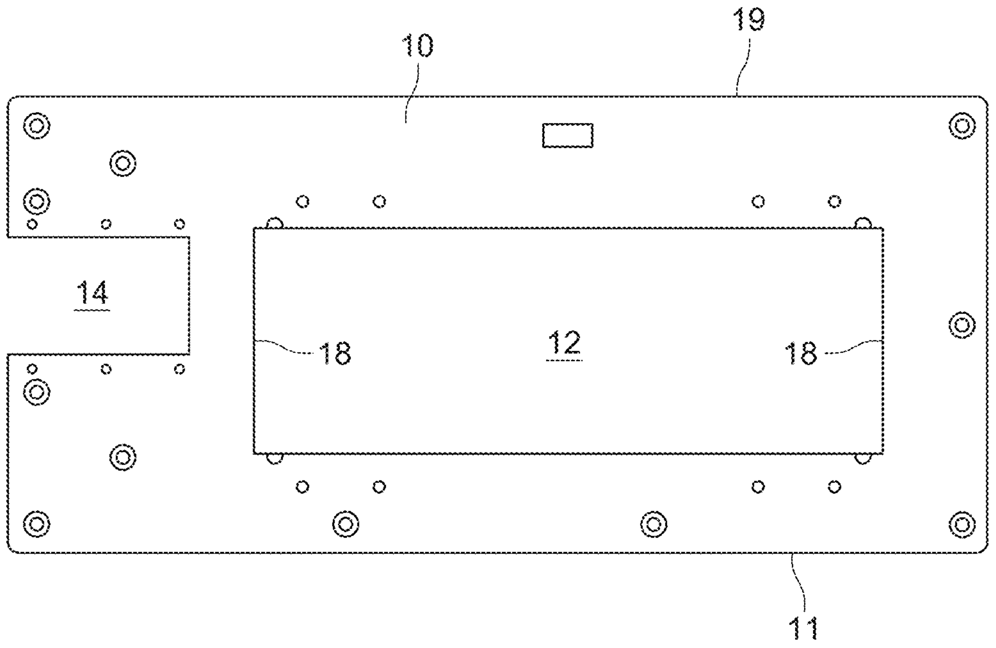
FIG. 2 is a front elevation view of an exemplary embodiment of a front frame plate 10 of the frame assembly of the subject disclosure.

Referring the FIG. 2, the front frame plate 10 provides a front opening 12. Outward of each of the two lateral edges 18 of the front opening 12 is a front door spring canal (not shown, but the mirror image of the rear door spring canal 26 of FIG. 3B) that is journaled or otherwise formed in the front frame plate 10, along its inward facing surface. The front spring canal may have a substantially semi-circular cross section that terminates inward of the upper and lower edges 11 and 19, respectively, of the front frame plate 10. The front frame plate 10 also provides a peripheral lock void 14 for housing the locking mechanism 40. The locking mechanism 40 provides a locking plate 42 with a toothed rack 44. The toothed rack 44 faces inward toward the front opening 12 but spaced apart therefrom. One of the front spring canals is disposed between the front opening 12 and the toothed rack 44.

Figure 3A:
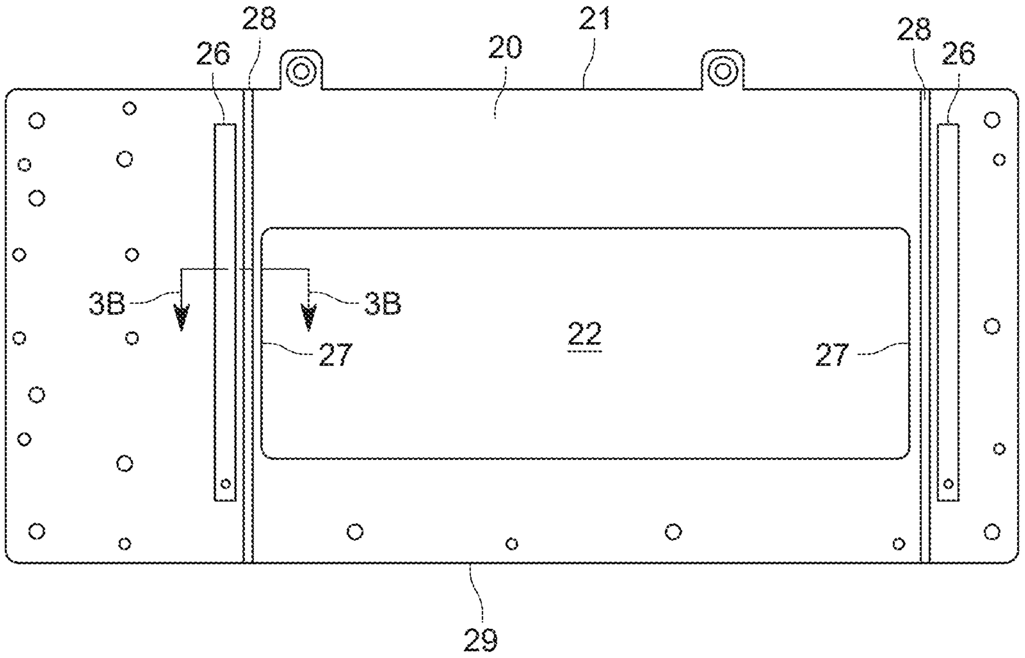
FIG. 3A is a front elevation view of an exemplary embodiment of the rear frame plate 20 of the barrier frame assembly of the subject disclosure.
Figure 3B:
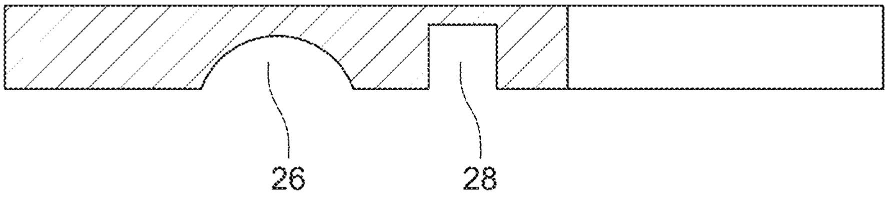
FIG. 3B is a detailed section view of an taken along line 3B-3B of FIG. 3A.

Referring to FIG. 3A, the rear frame plate 20 provides, just outward of each of the two lateral edges 27 of the rear opening 22 is a rear rail channel 28 journaled or otherwise formed in the rear frame plate 20, along its outward facing surface. Each of these two rear rail channels 28 may have a uniform cross section and extend from an upper edge 21 of the rear frame plate 20 to a lower edge 29 thereof. The cross section is dimensioned and adapted to slidably receive a guard-security rail 90. Just outward of each rear rail channel tracks 28 is a rear door spring canal portion 26 that is a journaled or otherwise disposed in the rear frame plate 20, along an outward facing surface thereof. The rear door spring canal 26 may have a substantially semi-circular cross section but terminate inward of the upper and lower edge 21 and 29, respectively, of the rear frame plate 20.

The front and rear door spring canal portions/halves 26 cooperatively align to define two spring canals 52 in which two respective door springs 50 reside. The spring 50 may provide a body 54 that houses a sliding piston 56 and a pneumatically store of potential energy source 60, in other words the "spring 50" is a piston-actuated device. From the sliding piston 56 and protruding out of the body 54 is a piston rod 58. Door spring 50 may be configured so that the piston rod 58 is biased or urges to protrude a predetermined distance. At the distal end of the piston rod 58 is a pedestal 57, providing surface area 59 for engaging the arch 39 of the canal cutout 38.

The sliding door 30 has a handle 37 along an upper edge thereof. The sliding door 30 has a main surface area that is dimensioned to cover the access opening (which aligns with the concentric openings 12 and 22 of the front and rear frame plates 10 and 20, respectively). Just inward of both its lateral edges 33 is a canal cutout 38 dimensioned and shaped to define the lateral edges of the door spring canal 52 of which the front and rear door spring canal portions 26 define the front and rear surfaces thereof. Again, the door spring 50 is housed in this spring canal 52 so that the pedestals 57 face towards the arches 39, respectively, wherein each arch 39 is defined by the upper surface of the canal cutouts 38. During use, surface area 59 of the pedestal 57 urges against the arch 39 when the sliding door 30 is in the closed position so that if the sliding door 30 is not in the locked engagement (by way of the locking mechanism 40) a bottom edge 31 of the sliding door 30 is urged approximately one-third of the vertical height of the access opening. This self-rising distance is adjustable by setting the predetermined distance of the piston rod 58. In other words, the piston-actuated devices are configured to bias the sliding door 30 to a partially open position where approximately two-thirds of the access opening is closed off, wherein the sliding door 30 is maintained in the partially open position by the presence of the piston-actuated devices.

Along one lateral edge 33 of the sliding door 30 provides a door toothed rack 34 that complements the toothed rack 44 of the locking mechanism 40, so that the two racks 34 and 44 are moveable (by way of a key for the locking mechanism 40) between a locked engagement and an unlocked engagement.

Figure 4:
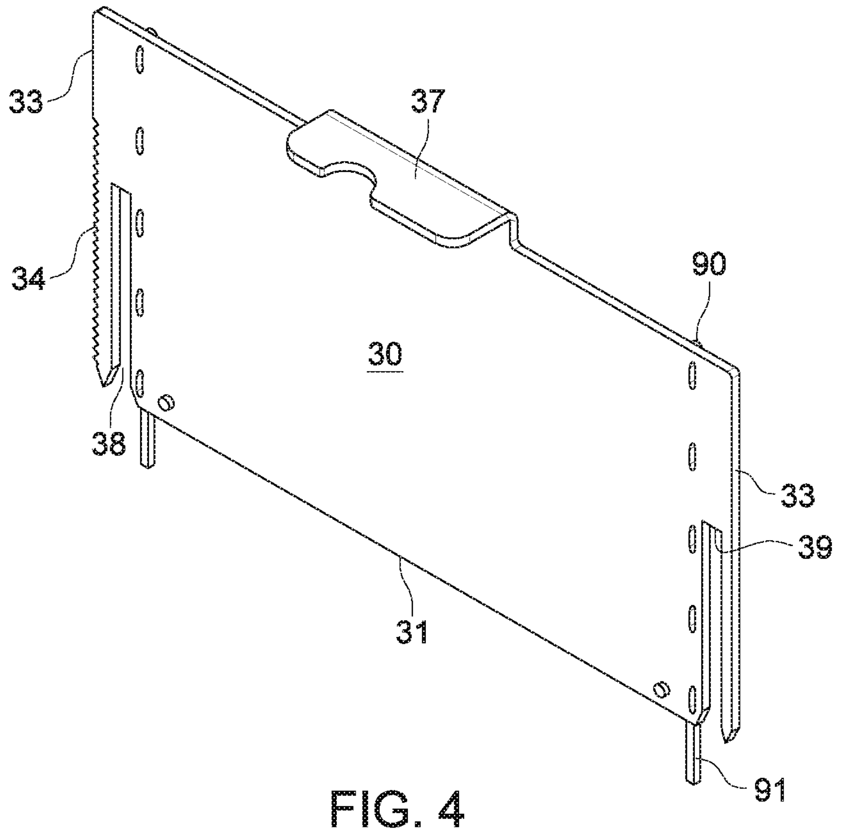
FIG. 4 is a perspective view of an exemplary embodiment of a sliding door 30 of the subject disclosure with guide-security rails attached.
Figure 5:
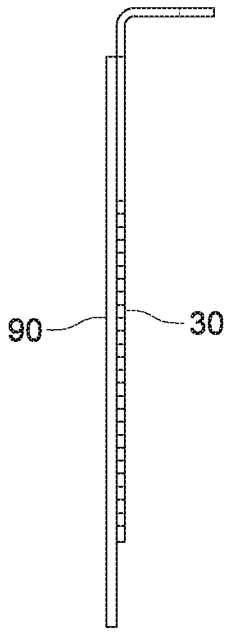
FIG. 5 is a side elevation view of an exemplary embodiment of the sliding door 30 of the subject disclosure with guide-security rails attached.
Figure 6:
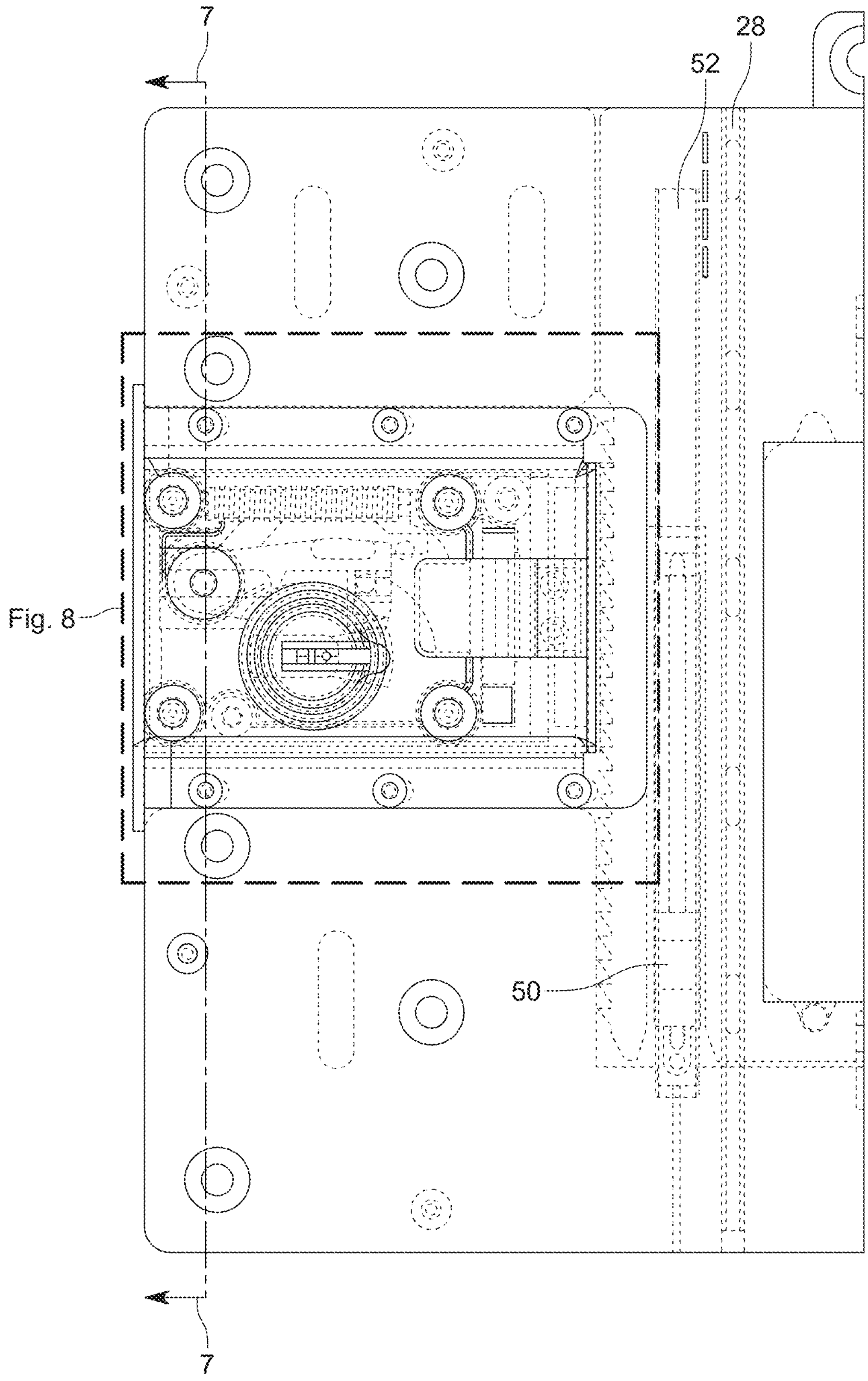
FIG. 6 is a front detailed elevation view of an exemplary embodiment of a locking mechanism of the barrier frame assembly of the subject disclosure, with the front frame plate 10 using ghost lines to illustrate a door spring canal 52 and a guide rail channel 28 for housing the door spring 50 and door guide bar, respectively.
Figure 7:
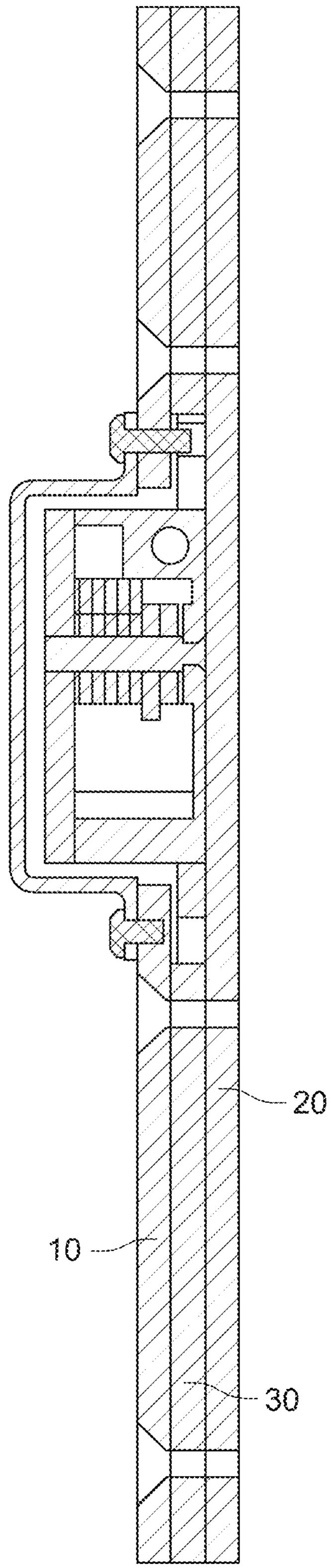
FIG. 7 is a section view taken along line 7-7 in FIG. 6.
Figure 8:
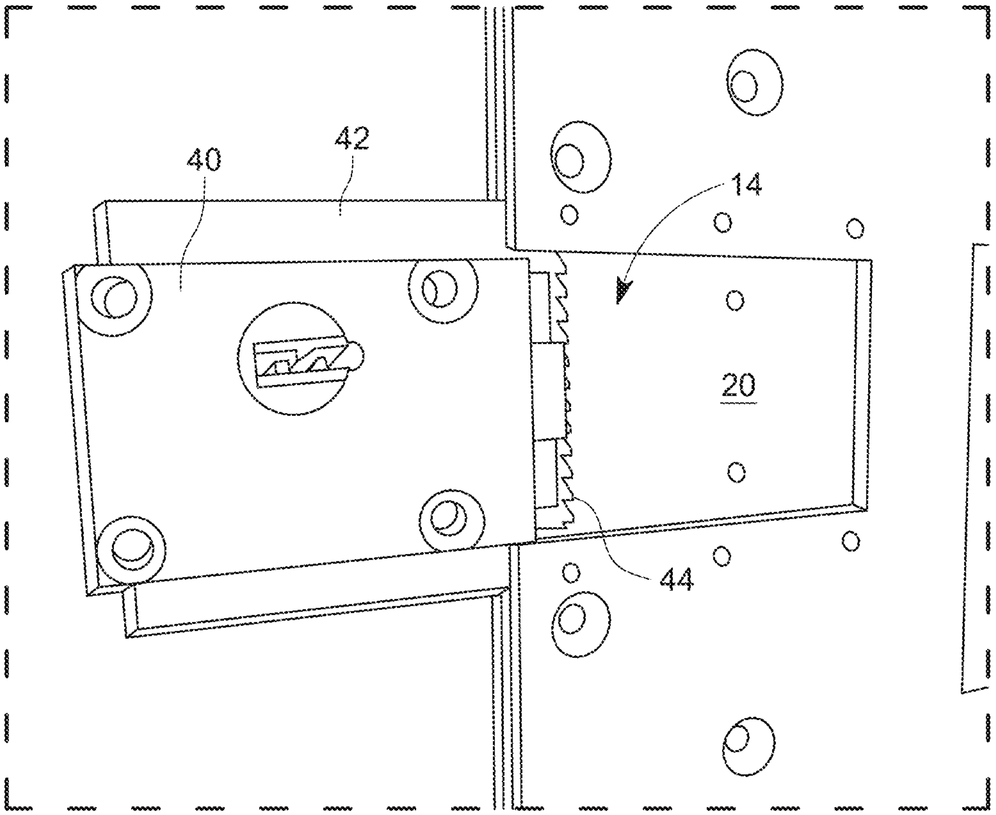
FIG. 8 is a detailed perspective view of a locking mechanism 40 that controls/secures the self-rising door, shown in a complementary lock void 14 of the frame into which it slides during initial construction.
Figure 9:
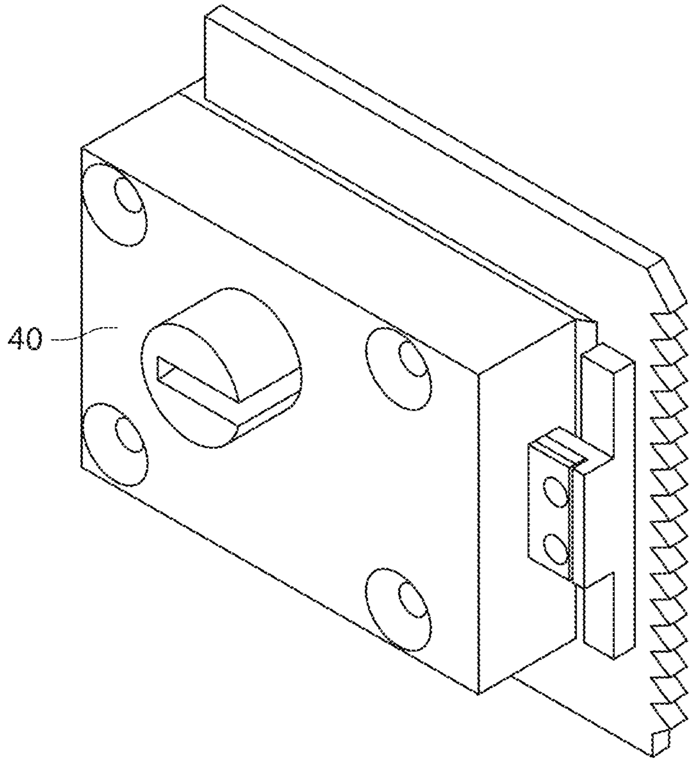
FIG. 9 is a perspective view of an exemplary embodiment of a locking mechanism 40 of the subject disclosure that controls and secures the self-rising door.
Figure 10:
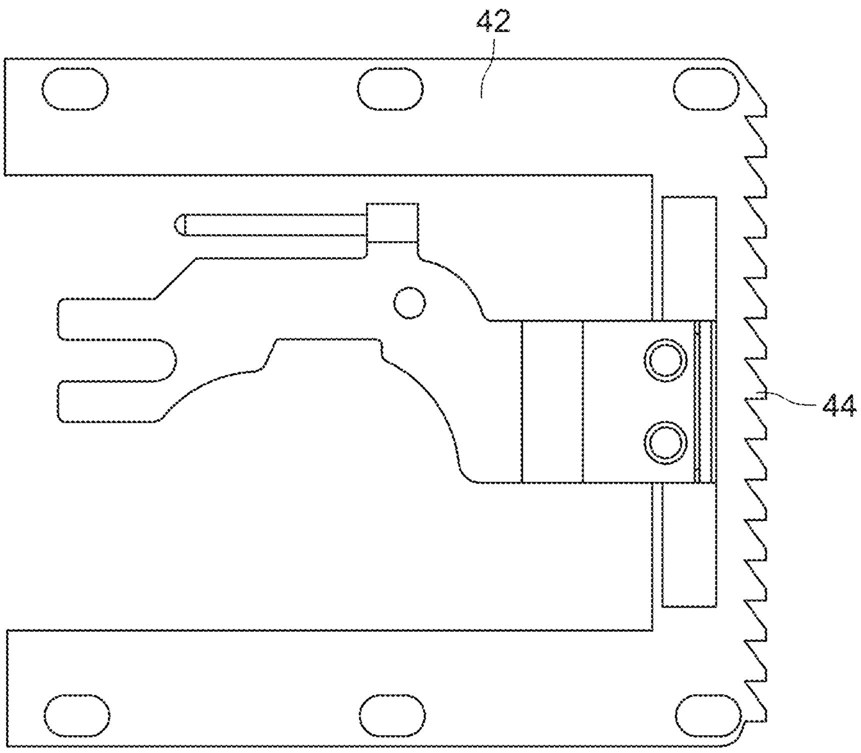
FIG. 10 is an elevation view of an exemplary embodiment of a locking plate 42 of the locking mechanism 40 of the subject disclosure.
Figure 11:
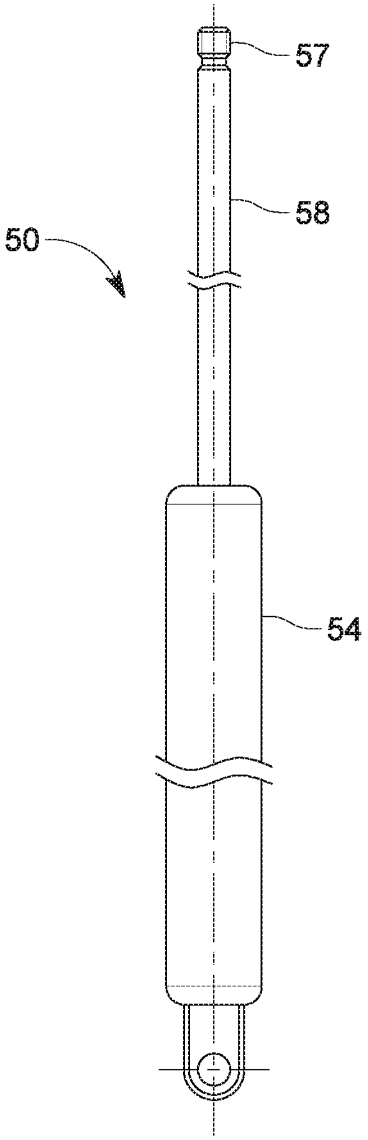
FIG. 11 is an elevation view of an exemplary embodiment of the door spring 50 of the subject disclosure.
Figure 12:
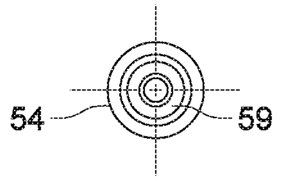
FIG. 12 is a top plan view of an exemplary embodiment of the door spring 50 of the subject disclosure.
Figure 13:
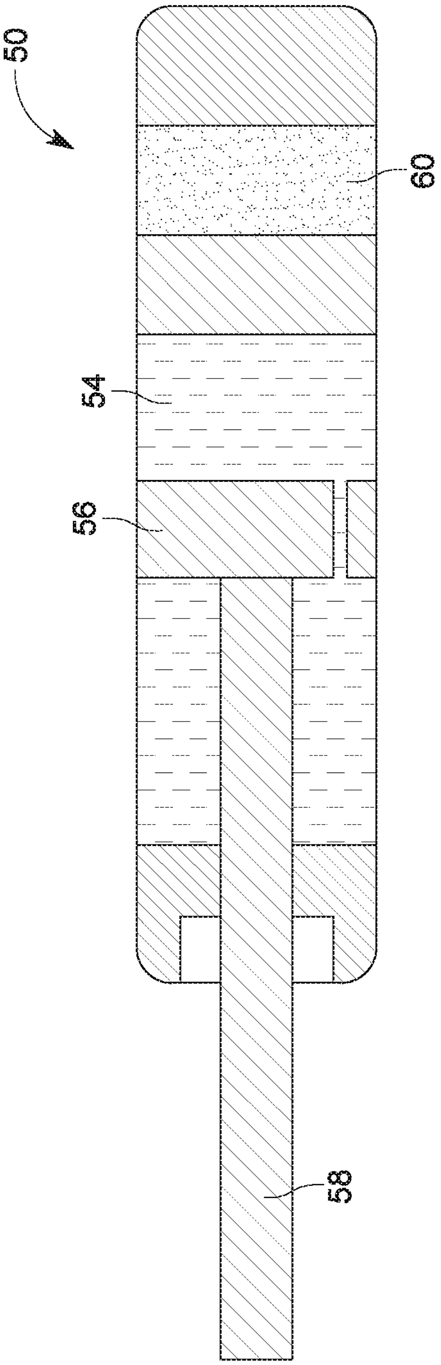
FIG. 13 is a schematic view of an exemplary embodiment of the door spring 50 of the subject disclosure.
Figure 14A:
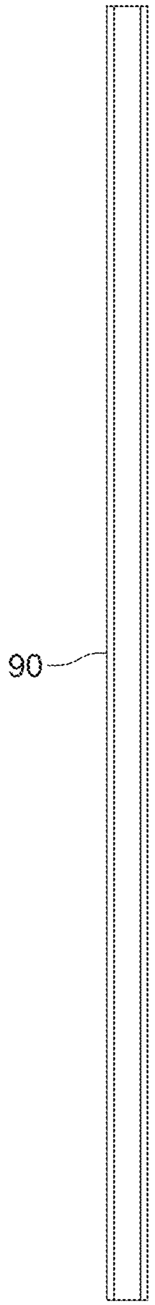
FIG. 14A is an elevational view of an exemplary embodiment of a guide-security rail 90 of the subject disclosure.
Figure 14B:
FIG. 14B is a top plan view of the guide-security rail 90 of FIG. 14A, illustrating the beveled edge 92.

Along the rear (side) of the sliding door 30, two guide-security rails 90 are connected (or integrated) so that a lower portion 91 of the guide-security rail 90 projects beyond the lower edge 31 of the sliding door 30, as illustrated in FIG. 4. Through this connection, the entire cross sections of two guide-security rails 90 run parallel with the lateral edges 33 of the sliding door 30, wherein each guide-security rail 90 is disposed inward of the two spring canal cutouts 52.

Each guide-security rails 90 may have beveled edge 92. The beveled edge 92 is an extended leading-edge component that travels through the guide-security channel 28. This beveled leading edge 92 guides the sliding door in a perfectly straight line in its travels between the open and closed positions relative to the barrier frame assembly. In some embodiments, the edge 92 could be a rounded ball shape for the same purpose. Without the bevel at the end of the leading edge of the guide-security rails 90 would be simply squared, and this rectangular profile could gouge into the stainless-steel machined cavity track in the frame causing the sliding door to jam in the frame when moving between the open and closed positions.

The beveled leading edge 92, that travels through the guide-security cavity channel 28 (along with the guide-security rail 90 extending pass the bottom of the steel door edge to make the guide-security rail 90 an actual leading component), was the design modification that successfully resolved the major problem of jamming issues of the steel door when being pushed down to close the door. Conceptually, the guide-security rail 90 length acts as a track that (like a roller coaster track) slightly bends 10×1000th of an inch following the track cavity.

During use, the guide-security rails 90 slide along rail channels 28 of the rear frame plate 20, thereby guiding the sliding door 30 on a linear path as it moves to and from the open position and the closed position between the front and rear frame plates. Furthermore, the presence of guide-security rail channels 28 occupied by the guide-security rails 90 of the sliding door 30, just outward of the openings 12 and 22, acts as a barrier to tampering as an isolated individual may try to pass a thin element or object between the sliding door 30 and the rear frame plate 20 by way of the openings 12 and 22 to tamper with locking mechanism 40.

Also, during use, the pedestals 57 of the door springs 50 urge against the arches 39 of the sliding door 30 so that when the locking mechanism 40 is disabled, in other words, when the sliding door 30 is in an unlocked engagement with the locking mechanism, the sliding door 30 is urged approximately one-third open by way of the door springs 50, this self-rising (partially open) distance may range from one and a half to four inches or more. This functionality facilitates one-hand use of the access opening closure system 100 as personnel need only key the locking mechanism 40 with one hand (while the other hand holds an object) since the sliding door 30 automatically is urged upward. To move the sliding door 30 further upward to increase access to the openings of the frame plates 10 and 20, a user would manually lift the sliding door 30 by way of its handle 37. Furthermore, the presence of the biasing door springs 50 acts as a safety device since in the prior art, when the sliding door moves vertically up and down between open and closed positions, accidental release of the sliding door 30 could result in it unexpectedly accelerating toward the closed position, possibly severely injuring a user through a guillotine effect. The redundant door springs 50 acts as a safety device by stopping the free-falling door approximately two inches from the fully close position thereby avoiding possibility of injury by the falling door. To fully close the door, the door must be physically/manually pushed down by the operator standing outside the housing unit cell.

The piston rods 58 and pedestals may be made from carbon steel. The other components may be made from corrosion resistant 301 stainless-steel, and super strong clear polycarbonate. The sliding door 30 may be computer numerical control (CNC) machined stainless steel plate so that it travels up and down in the stainless-steel machined frame plates 10 and 20 (with the assistance of the compression gas springs 50). The operation of the automatic self-rising stainless-steel sliding door 30 is purposely designed to be a one-handed operation procedure. This one-handed procedure of unlocking the door by staff outside the cell is initiated by turning the key to the locking mechanism 40, controlling the sliding door 30 which disengages the tooth rack 44 of the locking components of the locking mechanism 40. This disengagement of the locking components from the saw tooth teeth 34 of the automatic self-rising stainless-steel sliding door 30, causes the door to automatically rise from the closed position to the ⅓ (one third) open position. The fully open position of the sliding door 30 is accomplished by personnel outside the enclosed space again turning the key to the locking mechanism 40. Once the sliding door 30 is open to any position (other than fully closed), the sliding door 30 can be immediately closed by staff outside the cell by simply pushing down on the handle of the sliding door 30. No key, or disengagement of the door locking device is needed to close the sliding door 30 from any open position. This feature was developed to assure immediate isolation of the person inside the cell from the staff outside the cell in case an emergency should develop. This "No Key" ratcheting door locking mode is only accessible at the closing of the sliding door 30 and can be used in emergency situations that warrants immediate closure.

The access opening closure system 100 may provide a detachable and transferable anti-splash box 70 that defines the compartment that creates a snug seal to minimize any gaps between the front frame plate and box, preventing the splashing of liquids. The detachable anti-splash box 70 300-degree unobstructed visibility inside the compartment's interior.

As used in this application, the term "about" or "approximately" refers to a range of values within plus or minus 10% of the specified number. And the term "substantially" refers to up to 80% or more of an entirety. Recitation of ranges of values herein are not intended to be limiting, referring instead individually to any and all values falling within the range, unless otherwise indicated, and each separate value within such a range is incorporated into the specification as if it were individually recited herein.

For purposes of this disclosure, the term “aligned” means parallel, substantially parallel, or forming an angle of less than 35.0 degrees. For purposes of this disclosure, the term “transverse” means perpendicular, substantially perpendicular, or forming an angle between 55.0 and 125.0 degrees. Also, for purposes of this disclosure, the term “length” means the longest dimension of an object. Also, for purposes of this disclosure, the term “width” means the dimension of an object from side to side. For the purposes of this disclosure, the term “above” generally means superjacent, substantially superjacent, or higher than another object although not directly overlying the object. Further, for purposes of this disclosure, the term “mechanical communication” generally refers to components being in direct physical contact with each other or being in indirect physical contact with each other where movement of one component affect the position of the other.

The use of any and all examples, or exemplary language (“e.g.,” “such as,” or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as “first,” “second,” “top,” “bottom,” “up,” “down,” and the like, are words of convenience and are not to be construed as limiting terms unless specifically stated to the contrary.

It should be understood, of course, that the foregoing relates to exemplary embodiments of the invention and that modifications may be made without departing from the spirit and scope of the invention as set forth in the following claims.

What is claimed is:

1. A closure system for an access opening in a barrier/door of an enclosure sized to confine at least one adult human being, the closure system comprising:

a rear frame plate attached to the barrier/door so that the rear frame plate circumscribes the access opening and that an opening of the rear frame plate aligns with the access opening;

one or more canal portions formed into the rear frame plate, wherein an entire periphery each said canal portion is inward of and circumscribed by an outer perimeter of the rear frame plate;

a front frame plate;

a sliding door configured to selectively slide between the rear and front frame plates between an open position and a closed position closing off the access opening; and one or more elongated actuators disposed in a respective one of the one or more canal portions and configured to bias the sliding door to a partially open position.

2. The closure system of claim 1, wherein the sliding door includes one or more cutouts formed therein corresponding to the one or more canal portions formed into the rear frame plate and the one or more elongated actuators disposed in a respective one of the one or more cutouts of the sliding door.

3. The closure system of claim 2, wherein a lower periphery of each said cutout communicates with a lower boundary of the sliding door.

4. The closure system of claim 3, further comprising:

two guide-security bars along a rear surface of the sliding door; and along the rear frame plate, two guide bar channels dimensioned to slidably receive the two guide-security bars, respectively.

5. The closure system of claim 1, wherein the partially open position occurs when the sliding door closes off approximately two-thirds of the access opening.

6. The closure system of claim 5, wherein the partially open position is maintained by an operative association between the one or more elongated actuators and the sliding door.

7. The closure system of claim 6, wherein distal end of each of the one or more elongated actuators directly contacts the sliding door.

8. The closure system of claim 1, further comprising a lock mechanism operatively associated with the sliding door so as to form a locked engagement therewith, and wherein the lock mechanism is selectively movable from the locked engagement to an unlocked engagement enabling a bias of the one or more elongated actuators to move the sliding door to the partially open position.

9. The closure system of claim 8, wherein the bias of the one or more elongated actuators is configured to maintain the sliding door in the partially open position.

10. The closure system of claim 1, wherein an entirety of each said elongated actuator is confined between the rear and front frame plates.

11. The closure system of claim 1, wherein each said elongated actuator is a piston-actuated device.

* * * * *